(No Model.)
C. KEYWORTH.
Treating Bone to Imitate Stag Horn.
No. 229,145. Patented June 22, 1880.
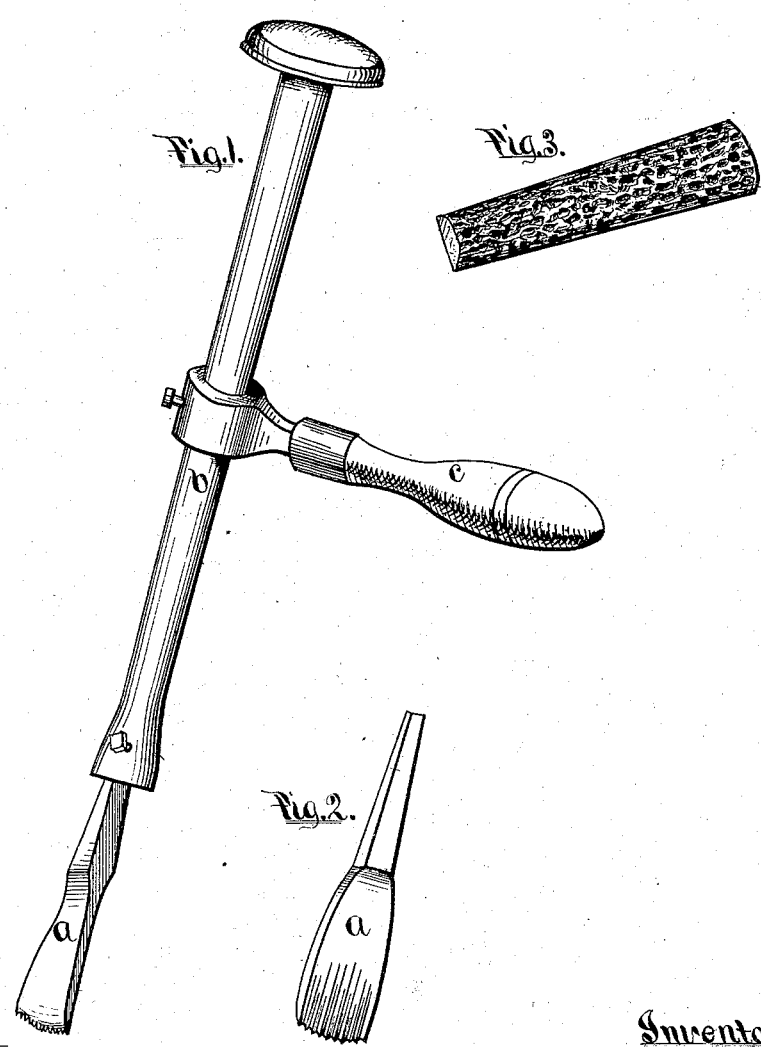

UNITED STATES PATENT OFFICE.

CHARLES KEYWORTH, OF SALISBURY, CONNECTICUT.

TREATING BONE TO IMITATE STAG-HORN.

SPECIFICATION forming part of Letters Patent No. 229,145, dated June 22, 1880.

Application filed May 20, 1880. (No model.)

*To all whom it may concern:*

Be it known that I, CHARLES KEYWORTH, of Salisbury, in the county of Litchfield and State of Connecticut, have invented a certain new and useful Improvement in the Manufacture of Bones in Imitation of Stag-Horn, of which the following is a description, reference being had to the accompanying drawings, where—

Figure 1 is a view of the tool I use. Fig. 2 is a view of the tool-blade, and Fig. 3 is a view of the product.

This improvement is very simple but very valuable. By it I produce an imitation of stag-horn, for knife-handles and the like, that cannot be distinguished from the real horn, unless it be by an expert, and that is even more durable than the real article.

I take sound bone and shape it, in general, to the desired form of handles, scale, or the like. Then with the tool shown in Fig. 1 (an invention of mine) I carve the surface of the shaped bone into irregular pits. This implement consists of a carving tool or chisel, $a$, with a plurality of cutting-points, which is given a rolling motion as it is slowly advanced longitudinally on the stock, the rolling motion being attained by means of the lever $b$ or some equivalent device, the shape and motion of the chisel being so adapted to the nature and material of the bone that the surface of the bone is cut, pitted, and carved with a systematic irregularity, exactly resembling the surface of stag-horn. Then I color the surface of the stock by boiling it in a dye composed of a decoction of equal parts of logwood, barwood, and camwood dust till the color of stag-horn is attained.

I claim as my invention—

An imitation of stag-horn, composed of bone shaped, carved, and dyed substantially as described.

CHARLES KEYWORTH.

Witnesses:
DONALD T. WARNER,
F. A. JEWELL.